United States Patent
Roberts

[15] 3,707,203
[45] Dec. 26, 1972

[54] CENTRALIZED LUBRICATION SYSTEM

[72] Inventor: Robert D. Roberts, Streetsboro, Ohio

[73] Assignee: Houdaille Industries, Inc., Buffalo, N.Y.

[22] Filed: March 29, 1971

[21] Appl. No.: 128,707

[52] U.S. Cl..................184/6.4, 184/7 D, 307/225
[51] Int. Cl..................................F16n 29/00
[58] Field of Search..............184/7 D, 7 E, 6.1, 6.4; 307/225

[56] References Cited

UNITED STATES PATENTS

| | | | |
|---|---|---|---|
| 3,561,565 | 2/1971 | Woor et al. | 184/7 D |
| 3,381,776 | 5/1968 | Gruber et al. | 184/7 D X |
| 3,074,509 | 1/1963 | Robson | 184/7 E |
| 3,127,954 | 4/1964 | Callahan et al. | 184/7 D |
| 3,515,245 | 6/1970 | Obergefell | 184/7 E |

Primary Examiner—Manuel A. Antonakas
Attorney—Hill, Sherman, Meroni, Gross & Simpson

[57] ABSTRACT

A cyclic type lubrication system for lubricating an intermittently operated device having operating cycles of varying time durations. The system includes a control and monitoring mechanism for initiating a lubrication cycle after the device has been operated through a predetermined number of operating cycles and for providing an indication whether the lubricating cycle has been completed during a predetermined number of operating cycles of the device after initiation of the lubrication cycle.

5 Claims, 5 Drawing Figures

PATENTED DEC 26 1972   3,707,203

INVENTOR.
Robert D. Roberts

BY  Hill, Sherman, Meroni, Gross & Simpson  ATTORNEYS

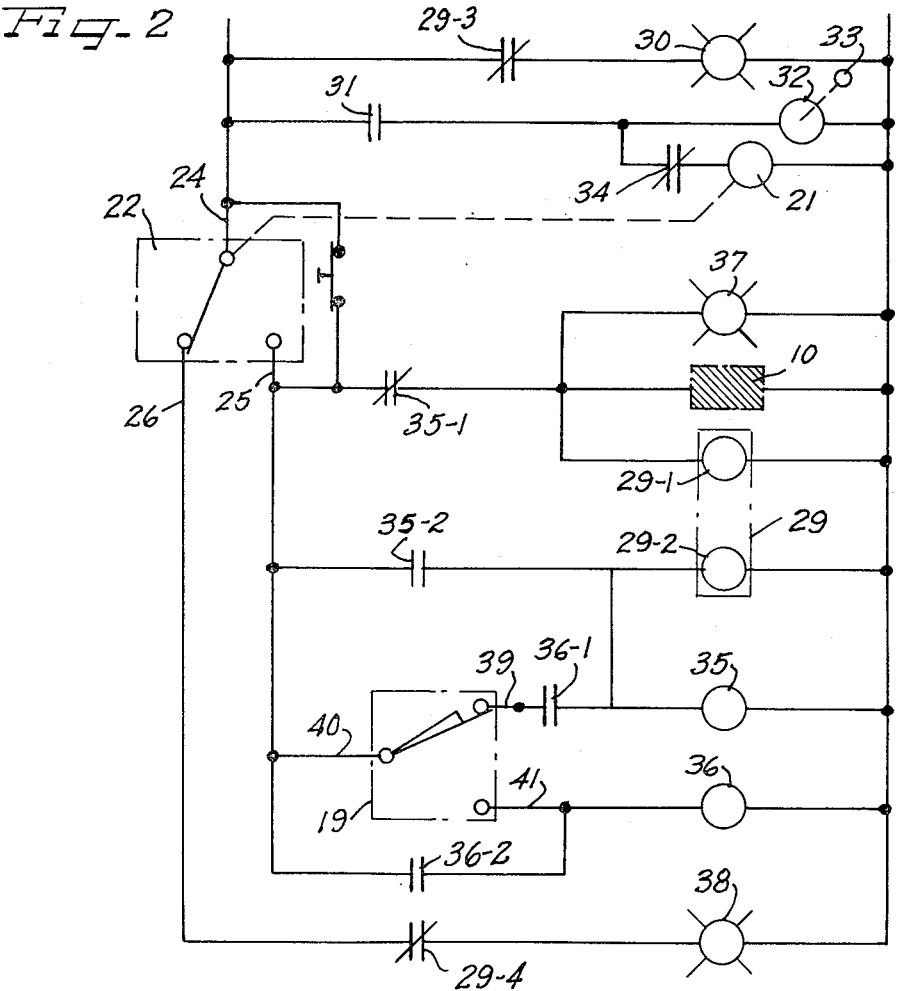
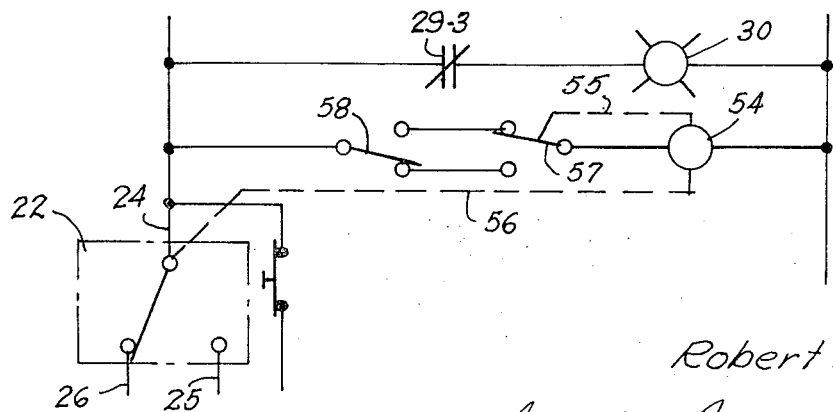

CENTRALIZED LUBRICATION SYSTEM

BACKGROUND OF THE INVENTION

1. Field of the Invention

This invention relates generally to the field of lubrication systems and more particularly to such systems of the cyclic type which, upon initiation of a cycle, lubricate one or more points of use successively during periodic cycles of the system. Reference may be made to a number of patents which are expositive of such cyclic type of lubricating systems among which are U.S. Pat. Nos. Re.21,236; 2,718,281; 2,792,911; 2,834,433; 3,025,929 and 3,074,509.

2. Description of the Prior Art

Each of the lubrication systems disclosed in the above patents includes a distribution device having a plurality of plungers each of which moves back and forth during each cycle of operation of the lubrication system. In addition, certain of said lubrication systems includes means for indicating normal operation of the system and included in such means is an element moveable back and forth between a pair of operating positions each time the lubrication system has completed a lubrication cycle.

Heretofore, it has been known to control the initiation of a lubrication cycle in several ways. For example, it is known to control the initiation of a lubrication cycle purely in response to time or in response to the operating time of the device to which the lubrication system is connected. An example of such a time responsive system is disclosed in U.S. Pat. No. 3,127,954.

A time responsive system for initiating and controlling the operation of a cyclical lubricating system has particular advantage in situations in which the device being lubricated either operates continuously or requires a predetermined volume of lubricant per period of operating time. For example, the large, generally continuously operated pancake-type compressors used in gas transmission lines are illustrative of devices which can advantageously utilize purely time responsive lubrication initiation.

With respect to intermittently operated machinery, it has been known in the prior art to initiate a lubrication cycle as a function of a predetermined number of operating cycles of the device. In such situations, the lubrication system can be initiated by means of a counting device which merely counts the number of operating cycles of the device and initiates the operation of the lubrication system after the device has completed a predetermined number of operating cycles.

There are applications of cyclic lubrication systems where neither of the aforementioned lubrication cycle initiation arrangements is entirely satisfactory. In some applications, the lubricated device operates intermittently through successive operating cycles but the duration of such operating cycles varies as a function of the particular application of the device. For example, it is desirable to lubricate the movable components of an injection molding device with a given volume of lubricant after a predetermined number of operating cycles of the molding device. The duration of operating cycles, however, varies considerably depending upon, for example, the specific type of plastic being used in the injection molding device or the size or configuration of the molded article.

Thus, an injection molding device may have operating cycles of 3 to 4 seconds of duration being utilized to mold one type of an article but the same device may have an operating cycle of 1 hour or more when being used to mold another article.

The duration of the operating cycle of many other types of machinery is also variable. For example, the operating cycle of a milling machine depends upon the length of the workpiece, the material of which the workpiece is constructed and the like. The operating cycle of a drilling machine may depend upon the thickness of the workpiece. The duration of the operating cycle of a press may vary as the material of which the workpiece is made varies and as the configuration of the final product varies.

Other examples of devices and machines which operate intermittently through operating cycles of varying duration are numerous, but many or all of such devices have this point of commonality in that they are generally best lubricated by a cyclic lubrication system which provides a charge of lubricant at the various points of utilization thereof after the device has completed a predetermined number of operating cycles.

The prior art also discloses means for monitoring the operation of cycle lubrication systems to ensure that the system is operating satisfactorily. Heretofore, such arrangements for monitoring the operations of cycle lubrication systems have performed their monitoring function in a manner corresponding to the lubrication cycle initiation control. For example, in lubrication systems which include means responsive purely to time for initiating a lubrication cycle, the monitoring system is generally effective to provide an indication of whether the lubrication system has been completed within a predetermined time period. On the other hand, where the initiation of the lubrication system is controlled as a function purely of the number of operating cycles of the lubricated device, the monitoring system functions in the corresponding manner by indicating whether the lubrication cycle has been completed merely during the predetermined number of operating cycles of the lubricated device. Neither of the aforementioned monitoring arrangements are particularly satisfactory when the initiation of the lubrication system is controlled as a function of a predetermined number of operating cycles in an intermittently operated device, the duration of the operating cycles of which vary as a consequence of the features mentioned hereinabove.

The present invention involves a cyclic lubrication system, the operation of which is initiated as a function of the number of operating cycles of an intermittently operated device, the duration of the operating cycles of which may be varied, and includes means for monitoring the operation of the lubricated system, as a function of operating cycles of the lubricating device regardless of variations in the duration of the operating cycle of the device. It should be understood that the initiation of the operation of a cyclic lubrication system can be controlled by means of a counter mechanism even in applications wherein the operating cycle of the lubricated device varies. As will be understood by those skilled in the art, however, the conventional counting mechanisms while providing a high degree of accuracy in terms of the number of counts generally have little or no flexibility with respect to the number of counts required to provide an initiation signal in that the number of counts is fixed by counter structure. Thus, in the embodiment of counting mechanisms in cycle lubrication systems in which the lubrication system must be initiated in response to a varying number of operating cycles, the utilization of a conventional counting mechanism is proscribed by the inflexibility of such counting mechanisms.

SUMMARY OF THE INVENTION

The invention may be summarized as comprising a lubrication and monitoring system for supplying lubricant to an intermittently operating device having varying operating cycle time durations in which cyclic type lubricant distribution means is controlled to provide lubricant to the operating device from a pressurized lubricant supply by means which senses the initiation of an operating cycle of the device and generates a signal of predetermined duration in response to the initiation of the operating cycle. Means are provided to initiate the lubrication cycle in response to a period of time which corresponds to the period of time during which a predetermined number of the signals of predetermined duration are generated. In a first embodiment, the means for generating a signal of predetermined duration includes a variable time delay relay which is responsive to the initiation of an operating cycle of the lubricated device to provide a signal of selected duration. In another embodiment, the generation of a signal of predetermined duration is controlled by a motor driven cam means which operates in response to sensing the initiation of an operating cycle of the lubricated device.

It is therefore the primary object of the invention to provide a lubrication and monitoring system for devices which are intermittently operated and have variable operating cycle times.

Another object of the invention is to provide a means for controlling lubrication for such devices with a certain degree of flexibility for selecting a response to the operating cycle of the lubricated device.

Many other features, advantages and additional objects of the present invention will become manifest to those versed in the art upon making reference to the detailed description which follows and the accompanying sheets of drawings in which preferred structural embodiments incorporating the principles of the present invention are shown by way of illustrative example only.

BRIEF DESCRIPTION OF THE DRAWINGS

Examples of the invention are illustrated in the accompanying drawings in which:

FIG. 2 is a schematic circuit diagram of a first embodiment of a lubrication and monitoring system for use in association with the system illustrated in FIG. 1 and constructed in accordance with the principles of the present invention;

FIG. 4 is a schematic circuit diagram of another embodiment of a lubrication and monitoring system which may be utilized in association with the lubrication system illustrated in FIG. 1 and constructed in accordance with the principles of the present invention.

DESCRIPTION OF THE PREFERRED EMBODIMENTS

Figure 1:
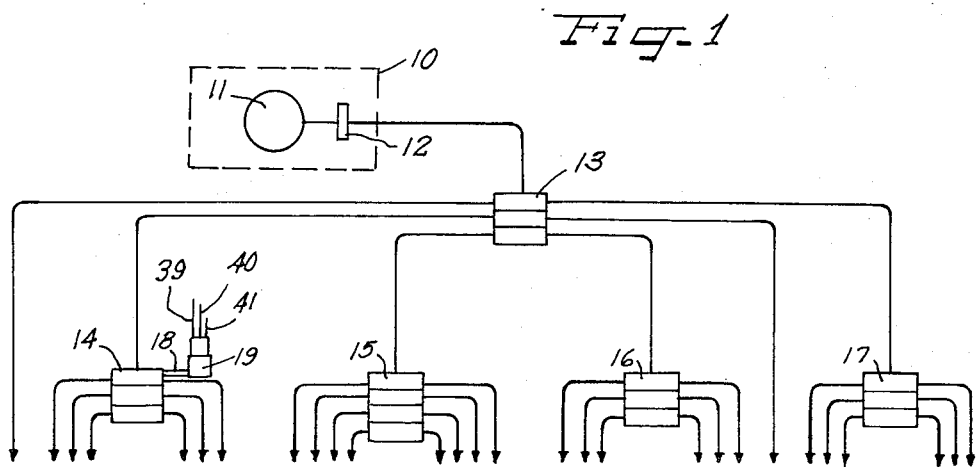
FIG. 1 is a diagrammatic view of a lubrication system in which the present invention may be utilized.

A centralized lubricating system illustrated in FIG. 1 supplies lubricant to several stations, as indicated by the arrows at the downstream ends of the branch lines and proportions the supply of lubricant between the several stations from a lubricant feeding means 10 which may include a pump 11 which is actuated by a pressure-responsive switch or the like and supplies from a reservoir (not shown). The energization and deenergization of the lubricant supply may involve merely turning on and off the pump 11. As an alternative, the pump or other fluid supply or pressure-maintaining means may constantly run to afford a pressure supply head, and a solenoid operated valve 12 in the lubricant supply line may be opened and closed to turn on and off the lubricant feed to the system.

Various systems for effecting a lubricant feed may be provided as set forth in the aforementioned U.S. Pat. No. 3,127,954 and it will be understood that the lubricant feeding means may comprise various suitable combinations of pumps and valves as suitable lubricant feeding means.

The lubrication system includes a number of lubricant distributors 13, 14, 15, 16 and 17. The distributor 13 will be seen to comprise a main distributor and the distributors 14–17 will be seen to comprise subsidiary distributors. These distributors are cyclic type distributors as described, for example, in any of the initially mentioned patents.

The subsidiary distributor 14 is provided with a protruding plunger extension 18 in the same manner as illustrated in U.S. Pat. No. 2,834,433 at reference 2d, except that the extension 18 is adapted to actuate a switch 19 associated with a cycle counter as set forth hereinbelow.

Figure 5:
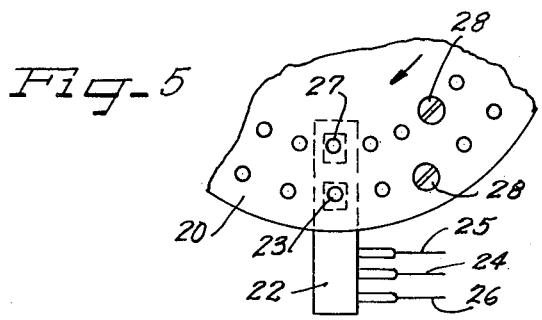
FIG. 5 is a partial schematic and fragmentary view of a two-phase pin type timer which may be employed in practicing the present invention.

A portion of a simple clock driven timer which may be employed in practicing the present invention is illustrated in FIG. 5. The timer comprises a disc 20 which is rotated by a clock drive 21 under the control of an intermittently operated device which is to be lubricated. This control is illustrated in FIG. 2, for example, by a normally open switch contact 31 which closes upon the initiation of an operating cycle of the device to be lubricated and remains closed for the duration of such operating cycle. A switch 22 is provided with a button 23 which is engaged upon rotation of the disc 20 to establish a connection between the conductors 24 and 25, and with a button 27 which is engaged to establish a connection between the conductors 24 and 26. In the aforementioned U.S. Pat. No. 3,127,954, the timing cycle is set by placing pins 28 in the proper holes to turn the switch 22 on and off at the desired times. In such a constantly operating system, the pin type timers are well known and may be advantageously utilized.

They may include only one set of pins as indicated in the drawings or may include several sets of pins placed around the periphery of the timer disc 20. In a typical timer application, for example, a minimum of 37 ½ seconds "On" time may be provided; in a 1-hour cycle, either 7 ½ or 12 minutes "on" time may be provided; and 15 minutes may be provided in a 24-hour cycle. Thus, in a 24-hour operation for example there may be one, two or even more 15-minute active cycles provided through the utilization of such a timer and positioning one, two or more pairs of pins 28 at the necessary corresponding positions. The present invention, however, contemplates the utilization of such a simple timer in a monitoring and lubrication system which is not responsive to operating time of the device to be lubricated, but responsive to the number of operating cycles of the device to be lubricated, or particularly to the operating cycles of an intermittently operated device. Referring to FIG. 2, a particular circuit is schematically illustrated in which the switch 22 is shown in its normal or quiescent phase position. The cycle counter switch 19 is shown in its normal position.

Under these conditions, a normally closed set of contacts 29-3 establishes a circuit for connection to an electrically supply through an indication means 30, for example, a green lamp.

The circuit is provided with a set of switch contacts, normally provided at the lubricated device, which contacts close upon initiation of the operating cycle of the lubricated device. The closure of the contacts 31 establishes a powering circuit for a time delay relay 32 and a timer motor 21 via a normally closed contact 34 of the time delay relay 32. Energization of the timer motor 21 effects rotation of the disc 20 and rotates the pins 28 toward the switch 22; however, this rotation is incomplete for any single operating cycle of the lubricated device in that the time delay circuit 32 is effective to open its contact 34 and deenergize the timer motor 21 after a predetermined duration. Therefore, the time delay relay 32 and its contact 34 must respond to a plurality of closures of the switch contacts 31 to generate a corresponding plurality of signals of predetermined duration which are effective to provide a sufficient number of energizations of the timer motor 21 in order to rotate the disc 20 a sufficient predetermined amount to position a pin 28 at the contact tab 23.

When the outer or "on" pin 28 contacts the tab 23, the switch 22 reverses its position from that illustrated in FIG. 2 and establishes a connection between the conductors 24 and 25 to energize the lubricant feeding means 10 by way of a set of normally closed relay contacts 35-1.

An indicator 37, which may be provided by an amber lamp, is connected in parallel to the lubricant feeding means 10 and is simultaneously energized with the lubricant feeding means 10 to indicate that the lubrication cycle is in process. Another circuit is also simultaneously established through a self-interrupting latch coil 29-1 of a cycle failure relay 29 by way of the normally closed contacts 35-1.

The cycle failure relay 29 is also provided with a self-interrupting unlatching coil 29-2. The circuit arrangement is such that when the latch coil 29-1 receives electrical energy, the relay 29 latches to a position such that a pair of its contacts 29-3 is open and a normally open pair of its contacts 29-4 is closed. The contacts 29-3 and 29-4, respectively, remain open and closed until subsequent pulsing of the unlatching coil 29-2 at which time the contacts 29-3 and 29-4 respectively resume their normal conditions, i.e. closed and open.

The coils 29-1 and 29-2 may be, as well known in the art, self-interrupting in the sense that the relay 29 is arranged so that the circuit through the respective coils is broken as soon as the latch and unlatch positions of the relay are reached. This arrangement enables the latch or unlatch condition to be maintained without continued energization of either of the coils of the relay.

When the latch coil 29-1 is energized and the contacts 29-3 are opened, the normal or "satisfactory history" signal indicated by the lamp 30 is discontinued. However, although the corresponding contacts 29-4 are in a circuit with an alarm device, such as a red lamp 38, an alarm is not activated in that the circuit is opened since the conductor 26 is disconnected from the conductor 24 at the switch 22.

The operation of the lubricant feeding means 10 causes the lubricant to be distributed throughout the system. At a certain stage in this process, the element 18 in FIG. 1 on the distributor 14 will retract disconnecting the conductors 39 and 40 and establishing a connection between the conductors 40 and 41. During the initial portion of the cycle when the conductors 39 and 40 are connected, there is no energization of a relay 35 because of the interruption of the circuit by sets of normally open contacts 35-2 and 36-1. When the element 18 retracts and the leads 40 and 41 are interconnected, a relay 36 is energized and causes its normally open contacts 36-2 to close. Energization of the relay 36 also causes the normally open contacts 36-1 to close. However, the contacts 35-2 remain open since they are controlled by the relay 35. As the lubrication cycle approaches its completion, the element 18 again moves outwardly and moves the switch 19 to the position illustrated in FIG. 2. Since the relay 36 remains energized because of the holding contacts 36-2, the contacts 36-1 remain closed and as the conductors 39 and 40 are reconnected, the relay 35 is energized. This causes the holding contacts 35-2 to be closed. The unlatching coil 29-2 of the cycle failure relay 29 is also momentarily energized to close the contacts 29-3 and open the contacts 29-4. Energization of the relay 35 closes the holding contacts 35-2 so that even after the self-interrupting coil 29-2 operates to interrupt itself, the relay 35 remains energized. The completion of the outward movement of the element 18 therefore signals the completion of the lubricating cycle. When the relay 35 is energized, the normally closed contacts 35-1 are opened, interrupting the energization of the lubricant feeding means 10 and also deenergizing the lamp 37. Closing of the contacts 29-3 as, for example, by pulsing of the unlatching coil 29-2, immediately reenergizes the green lamp 30 to indicate that the desired distribution of lubricant has been accomplished. Subsequently, when the inner or "off" pin 28 engages the tab 27 to move the switch 22 back to the position illustrated in FIG. 2, no further change occurs except that the relay 35 is deenergized by the interruption of its circuit between the conductors 24 and 25. The alarm lamp 38 is not energized, however, in that the contacts 29–4 are now open.

Figure 3:
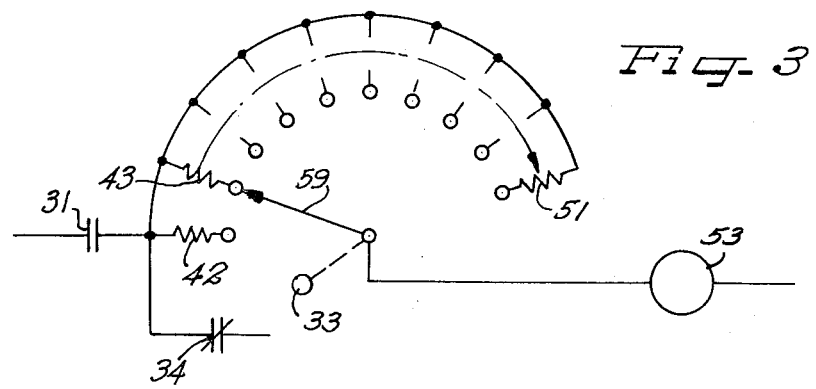
FIG. 3 is a schematic circuit diagram of a variable time delay circuit which may be utilized in the apparatus illustrated in FIG. 2.

Referring to FIG. 3, the time delay circuit or time delay relay 32 is shown as comprising an energizable circuit 53 which is effective to open the contacts 34 after a predetermined duration of energization. The predetermined duration of energization may be selected by means of a plurality of resistors 42–51 of different resistances which may be selectively connected in series with the circuit 53 by means of a wafer switch arrangement including a moveable pointer 52 which is manually operable by means of a control knob 33. The wafer switch arrangement constitutes a selector switch for selecting time ranges or counts whereby the counts or operating cycles of a lubricated device necessary to generate a signal at the opening of the contacts 34 may be selected. For example, the time delay circuit may be provided with a dial for selecting a delay time over a range of 10,000 counts at selected 1,000 count intervals, based on a 1-hour dial and 3,600 seconds per revolution.

Referring to FIG. 4, another embodiment of the invention is illustrated by means of a partial schematic diagram which is identical to the circuit set forth in FIG. 2 except for the apparatus for sensing operating cycles of the lubricated device. In this embodiment, the lubricated device is provided with a single pole double throw switch 58 which moves from its one contact position to its other contact position at the initiation of each operating cycle. A timer motor 54, for example, a synchronous motor, is provided for connection in series with the switch 58. The motor 54 is provided with a cam type linkage 55 for operating its contact 57 between first and second positions and a cam type linkage 56 for operating the switch 22. The timer motor 54 and its linkages and contacts may advantageously be provided by, for example, a Cramer model 525/526 type cycle timer which utilizes cams for operating switch contacts. Of course, any other suitable arrangement may be employed; however, the present illustration envisions the use of such a cycle timer wherein a cam with notches which are spaced in accordance with a time interval corresponding to the predetermined delay duration mentioned in connection with the circuit of FIG. 2. During operation, the contacts would initially be positioned as illustrated in FIG. 4. Upon initiation of an operating cycle of the lubricated device, the contact 58 would be moved to the upper position to establish an energizing path for the motor 54 by way of the contact 57. The motor 54 is therefore energized for a predetermined duration to provide through the linkage 56 a portion of the movement necessary for interrupting the connection between conductors 24 and 26 and establishing a connection between the conductors 24 and 25. The motor 54 is energized until such time as the linkage 55 transfers the contact 57 to its lower position to interrupt the path of energization of the motor 54. Upon the next initiation of an operating cycle of the lubricated device, the contact 58 is moved to its lower position to again establish an energizing path for the motor 54 by way of the contact 57 in its lower position. This action continues in response to each operating cycle of the lubricated device so that the motor 54 is effective to interrupt the connection 24, 26 and establish the connection 24, 25, then interrupt the connection 24, 25 and reestablish the connection 24, 26, whereby each interruption of one circuit and connection of another circuit is in response to a predetermined number of predetermined durations of energization of the motor 54. It is readily apparent from the foregoing discussions involving FIGS. 2–5, that pin or cam type timers may be advantageously utilized in a lubrication and monitoring system that is not continuously running or time responsive, but which is responsive to the operating cycle of an intermittently operated device. Monitoring by, for example, operation of the switch 19, may therefore be advantageously prescribed with respect to a number of operating cycles by selective spacing of the pins 28 in the case of a pin type apparatus or by the spacing of notches about a cam in the case of cam type apparatus.

Although I have described my invention by reference to specific illustrative embodiments thereof, such embodiments are given as non-limitive examples only. Many changes and modifications of my invention may become readily apparent to those skilled in the art without departing from the spirit and scope thereof, and I intend to include within the patent warranted hereon all such changes and modifications as may reasonably and properly be included within the scope of my contribution to the art.

I claim as my invention:

1. A lubrication and monitoring system for supplying lubricant to an intermittently operating device having varying operating cycle time durations comprising
pressurized lubricant supply means,
cyclic type lubricant distribution means having an element movable back and forth in response to the actuation of said distribution means through a complete lubricating cycle,
means for controlling the initiation of a lubricating cycle comprising
switch means closed by the lubricated device upon initiation of and throughout an operating cycle of the lubricated device, means connected to said switch means for generating a signal of predetermined duration in response to each closure of said switch means, and
means coupled to said signal generating means and responsive to a predetermined number of said signals of predetermined duration to activate said distribution means to initiate a lubrication cycle, and
means responsive to the back and forth movement of said element and operatively connected to said initiation control means for providing an indication whether a lubricating cycle has been completed within a predetermined number of operating cycles of the device.

2. A lubrication and monitoring system for supplying lubricant to an intermittently operating device having varying operating cycle time durations comprising
pressurized lubricant supply means,
cyclic type lubricant distribution means having an element movable back and forth in response to the actuation of said distribution means through a complete lubricating cycle,
means for controlling the initiation of a lubricating cycle comprising means for sensing the initiation of an operating cycle of the device and for generating a signal of predetermined duration in response to the operating initiation of said cycle, and means coupled to said sensing means and responsive to a period of time during which a predetermined number of signals is generated to activate said distribution means to initiate a lubrication cycle, means responsive to the back and forth movement of said element and operatively connected to said initiation control means for providing an indication whether a lubricating cycle has been completed within a predetermined number of operating cycles of the device, and said means for sensing the initiation of an operating cycle comprises a time delay relay having normally closed contacts and an operating circuit connectable to an energizing electrical supply by way of said device, said time delay relay operable to open said contacts after a predetermined interval of energization of said operating circuit, and said activation means is connected to the electrical supply by way of the device and said normally closed contacts and operable in response to a predetermined number of energizations of said time delay relay to activate said distribution means.

3. A lubrication and monitoring system according to claim 2, wherein said time delay relay includes means for adjusting the interval of energization of said operating circuit necessary to effect opening of said normally closed contacts.

4. A lubrication and monitoring system for supplying lubricant to an intermittently operating device having varying operating cycle time durations comprising pressurized lubricant supply means cyclic type lubricant distribution means having an element movable back and forth in response to the actuation of said distribution means through a complete lubricating cycle, means for controlling the initiation of a lubricating cycle comprising means for sensing the initiation of an operating cycle of the device and for generating a signal of predetermined duration in response to the operating initiation of said cycle, and means coupled to said sensing means and responsive to a period of time during which a predetermined number of signals is generated to activate said distribution means to initiate a lubrication cycle, means responsive to the back and forth movement of said element and operatively connected to said initiation control means for providing an indication whether a lubricating cycle has been completed within a predetermined number of operating cycles of the device, and said means for controlling the initiation of the lubricating cycle comprises a timing circuit having a plurality of contacts and means for operating said contacts in accordance with a programmed sequence, a first set of said contacts operable to connect said timing circuit to an energizing electrical supply by way of said device for said predetermined duration of time, and a second set of said contacts connected to said distribution means and operable to initiate operation of said distribution means upon energization of said timing circuit for a predetermined number of said predetermined durations.

5. A lubrication and monitoring system according to claim 4, wherein said means for operating said contacts includes at least one camming mechanism connected to and operated by said timing circuit.

* * * * *